Jan. 17, 1939.  C. H. ANGUS  2,143,906
AUTOMOBILE CIRCUIT CONTROL
Filed April 24, 1937
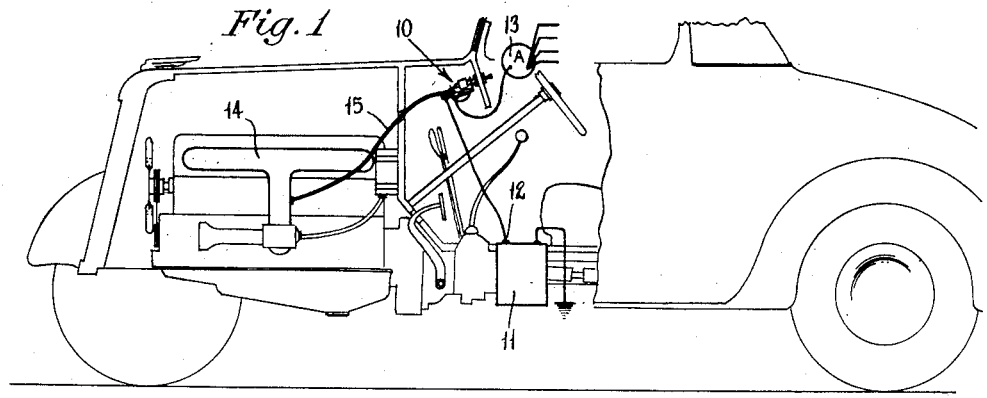
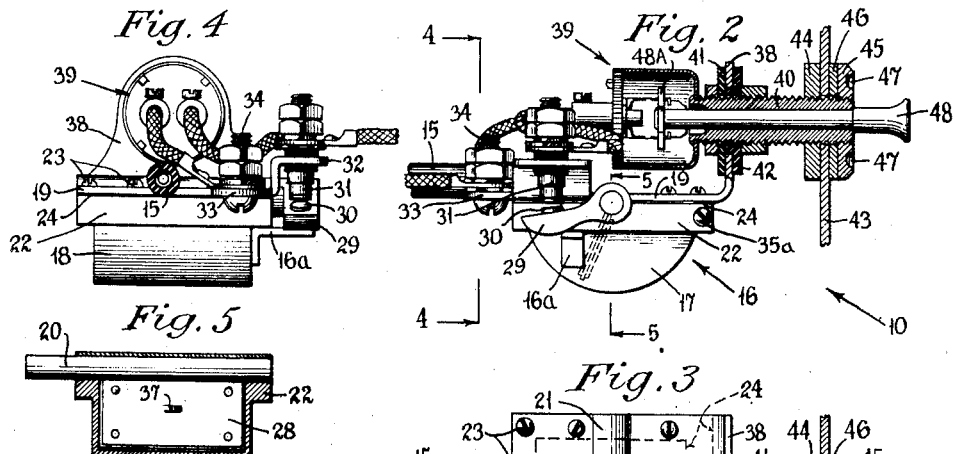
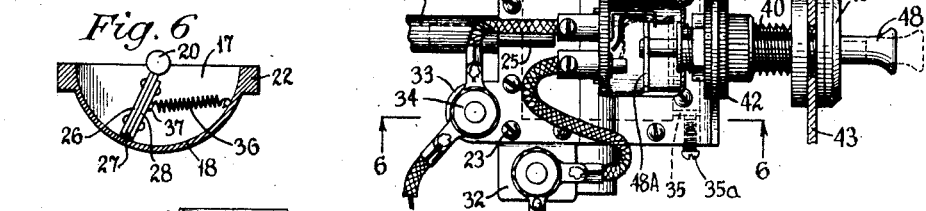
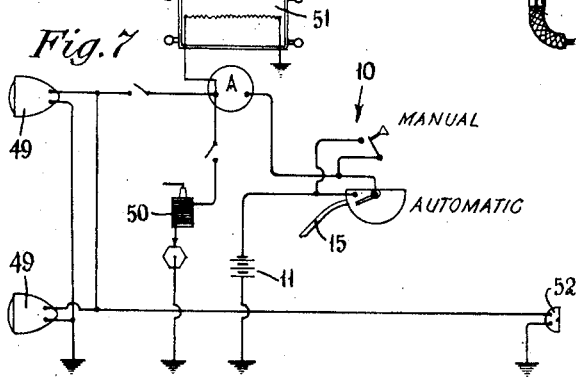
INVENTOR
Charles H. Angus,
BY
ATTORNEY Patented Jan. 17, 1939

2,143,906

UNITED STATES PATENT OFFICE 2,143,906

AUTOMOBILE CIRCUIT CONTROL

Charles H. Angus, Bridgeport, Conn.

Application April 24, 1937, Serial No. 138,718

14 Claims. (Cl. 200—81)

This invention relates to the control of electrical circuits in automotive vehicles.

In present day automobiles the use of electricity has been so extended for the convenience of the operator that numerous devices are now electrically operated, in addition to the usual ignition and lighting system. Included in these new electrically-operated devices are fender guide lights, defrosters, car heaters, radios, ventilating fans, air-conditioning equipment, direction signals, and others.

These devices are necessarily under the control of the operator, and as often happens because of the fallability of human nature, are not infrequently left functioning inadvertently when the car is parked or put away for the day. This results in wasteful drain on the car battery, wasteful use of, and sometimes damage to, the device or devices so left, and at times considerable inconvenience, as when the battery or device is so impaired as to render the car inoperative.

Various suggestions have been made heretofore in an effort to remedy some part of these difficulties, as by automatically controlling the ignition circuit, but these prior systems have been unable to prevent all of the damage and inconvenience as set forth above, since they were not adapted to control circuits other than the ignition circuit, and could not therefore be used satisfactorily to control the light circuits, heater circuit, etc.

It is an object of the present invention to prevent the inconvenience and damage, as above mentioned, due to inadvertent neglect of any or all circuits of the automobile when being left by the operator, and this object is accomplished by providing an improved circuit control system associated with the automobile engine and incorporating both manual and automatic operation in such a manner that the protection of the automatic operation is had while at the same time there is made possible manual control of any or all circuits as desired, from either individual switches or a master switch.

Therefore it is possible to rely on the automatic control of the circuit when leaving the car where no lights etc. are necessary, and also possible to operate the circuit to connect and energize the lights when these are required, as for parking on the streets at night.

Another object of the invention is to provide improved automatic circuit control means responsive to the condition of the engine in a vehicle, which is positive and sensitive in operation, stable over a wide range of engine speeds, and simple and economical of construction. In carrying out this object, the invention provides a vacuum-operated automatic control and switch which are particularly adapted for the condition to which they are responsive, the control being characterized mainly by a pressure-operated vane pivotally mounted in a semicylindrical confining casing and having the associated switch operatively connected thereto in such a manner that small pivotal movement of the vane causes a relatively large movement of the switch contacts. The casing is connected through a pipe line to the intake manifold of the engine so that the vacuum thereof is utilized to cause operation of the vane when the engine is running.

Also, the casing is provided with a vent admitting atmospheric pressure to one face of the vane, and the size of this vent is adjustable so that the air-confining chamber formed by the vane may be employed for a dashpot effect to prevent fluttering of the vane and opening of the circuit during momentary variations of the vacuum in the engine intake.

Other features and advantages will hereinafter appear.

In the accompanying drawing:

Figure 1 is a pictorial representation of an automobile embodying the automatic circuit control of the invention.

Fig. 2 is a side elevation of the automatic control, the manually operable switch and supporting means being shown in section.

Fig 3 is a top or plan view of the device of Fig. 2.

Fig. 4 is a rear view of the device, looking in the direction of the arrow in Fig. 2.

Fig. 5 is a vertical section, taken on the line 5—5 of Fig. 2, of the casing carrying the pressure-operated vane.

Fig. 6 is a vertical section of the casing carrying the vane, taken on the line 6—6 of Fig. 3.

Fig. 7 is a diagrammatic representation of part of the automobile circuit having incorporated therewith the automatic circuit control.

The circuit control of this invention, broadly designated by the numeral 10, is shown in Figs. 1 and 7 connected in the circuit of the automobile battery 11 between the ungrounded terminal 12 thereof and the ammeter 13 of the car to carry the entire current from or to the battery, the device 10 being operated automatically by the pressure conditions in the automobile intake manifold 14 through a connecting pipe line 15, and also manually when necessary by a suitable hand control. Except for the starting current from the battery 11, the entire energy to or from said battery for all car equipment is controlled by the circuit device 10, and this control is effective regardless of the nature and number of electrical accessories connected to the ammeter 13 or the method of their connection.

It will be noted that by virtue of the series connection through the device 10, the battery 11 is guarded against all unintentional discharge due to negligence upon the part of the car operator, regardless of the electrical circuit which has been neglected, and also guarded against any faults in the electrical circuit which might arise from causes not under the control of the operator.

Referring to Figs. 2 to 6, the automatic circuit control 10 is shown as having a semicylindrical casing 16 having semicircular end walls 17, a curved bottom 18 and a top plate 19, all forming substantially a closed chamber. Each end wall 17 is provided with a semicylindrical groove transversely of its upper edge at the midpoint thereof to form a bearing for a shaft 20, and the top plate 19 is bent to form a transverse semicylindrical rib 21 the ends of which are disposed over the grooves of the end walls so that said ends function as bearing straps for the shaft 20. Preferably the casing 16 is thickened and strengthened around its upper edge, as at 22, and the top plate 19 is secured to the casing by screws 23 screwing into said edge. A pair of U-shaped gaskets 24 are interposed between the top plate 19 and the top edge 22 of the casing to prevent leakage of air into the casing, and the thickness of the gaskets is such that a close bearing fit is provided for the shaft 20. The pipe line 15 from the intake manifold of the engine is preferably of the usual flexible rubber hosing, and is connected with the casing 16 by being fitted over a small section of metal tubing 25 secured to the top plate 19. The plate and the side wall of the tubing are both drilled so that the pipe 15 communicates with the interior of the casing.

As shown in Figs. 5 and 6, the shaft 20 carries a vane 26 of rectangular shape fitting closely within the inner walls of the casing and dividing same into two chambers so that a difference in pressure in the chambers will cause movement of the vane and turning of the shaft. Referring to Fig. 6, the vane 26 is provided with a U-shaped packing member 27 preferably of leather or other suitable material, said packing being secured to the vane by a rectangular plate 28 and rivets, as shown.

According to the invention, the casing 16 is adapted to carry a pair of contacts forming a switch to be actuated in response to movement of the vane 26. For this purpose the shaft 20 is provided with a contact arm 29 having a contact point 30 for engagement with a stationary terminal contact 31 insulatedly carried on an extension 32 of the top plate 19. Also, the plate 19 has a rearward extension 33 carrying an electrical terminal 34 not insulated therefrom so that the movable contact arm 29 is connected therewith at all times through the metal casing and top plate. Thus a switch is provided between the terminals 31 and 34, the switch being closed by clockwise movement of the vane 26 and arm 29, and being opened by counterclockwise movement of said vane and arm.

The casing 16 is provided with a small vent hole 35, see Fig. 2, so that atmospheric pressure is admitted to one face of the vane 26, and therefore when a vacuum exists in the intake manifold 14 and pipe line 15 the difference in pressure on the faces of the vane will cause clockwise movement of the latter to close the switch. It is desired that the switch be opened when no vacuum exists in the manifold 14, and therefore a yielding means in the form of a coil spring 36, see Fig. 6, is connected with the vane and casing. One end of the spring 36 is secured under a small hook on the inside of the casing, and the other end is secured to an eye 37 lanced from the plate 28.

Preferably the eye 37 is located intermediate the axis of the shaft 20 and the outer edge of the vane, so that a reduction in the force exerted by the spring 36 is effected, and that but little elongation of the spring will take place when the vane pivots in clockwise direction. Thus the switch is normally maintained in open-circuit position, and is closed when a vacuum is created in the intake manifold 14.

According to the invention, the upper edge 22 of the casing 16 is provided with a screw 35a adapted to extend into the vane 35 so that the size of said vent can be varied. Thus the response of the vane can be adjusted with respect to the strength of the spring 36 and the amount of vacuum of the automobile.

It will be noted that the contact point 30 is located at a distance from the axis of the shaft 21, and therefore only a very slight turning of the shaft is required to cause a relatively great travel of the contact point. Therefore the electrical circuit is completed and also broken in a positive manner in response to comparatively small movement of the vane 26.

For the purpose of limiting the extent of counterclockwise movement of the vane 26 and the arm 29 the casing 16 is provided with a stop 16a, see Figs. 2 and 4, in in the shape of an angle bracket secured to one end wall 17 of the casing. Preferably, the stop 16a is located fairly close to the contact 31 so that only a small movement of the vane and contact arm is permitted. Thus, when the engine is initially turned over for starting purposes the contacts 30 and 31 will engage at the very beginning of such turning over, so that the ignition circuit will be energized in readiness for starting.

According to the present invention the automatically operated switch as just described is shunted by a manually operable switch in order that the device may be used in controlling all the circuits of the automobile. For this purpose the top plate 19 is provided with an upward extension 38 which is apertured to carry a snap switch 39 of the conventional type. The mounting sleeve 40 of the switch is externally threaded and secured to the extension 38 by nuts as shown, and said extension is insulated from the sleeve by suitable washers 41 and 42, see Fig. 2, so that the part of the electrical circuit including the casing and top plate is isolated from the mounting of the device.

The switch 39 has one terminal connected with the terminal 34 on the top plate, and the other terminal connected with the terminal 31 by wires as shown, and the circuit of said switch is independent of the sleeve 40.

For mounting the device, the sleeve 40 of the switch passes through an aperture in the dashboard 43 of the car to be secured thereto by round nuts 44 and 45. Preferably a felt washer 46 is provided behind the front nut 45 to prevent marring of the finish of the dashboard, and, referring to Fig. 2, the nut 45 is provided with a pair of diametrically disposed recesses 47 to receive the usual type of two-pronged wrench for tightening the nut. The switch 39 is actuated manually by means of a plunger 48 extending through the sleeve 40 to the front of the panel, as shown, said plunger being insulated from the switch circuit by a fibre-actuating plate 48A.

Referring to Fig. 7, the device 10 of this invention is shown connected with the circuit in an automobile, said circuit including the headlights 49, ignition 50, defroster 51 and tail lamp 52, all energized by the battery 11 and under the control of the device 10.

Thus, according to this invention as exemplified by the device 10 incorporating the manually controlled switch 39, advantage may be had of automatic circuit control in response to the condition of the engine whereby all the circuits of the automobile except that of the starter are protected. By virtue of the manual control, special conditions can be met which had heretofore prevented the automatic controlling of all the circuits in the car. Thus, if it is desired to leave the car parked with the parking lights lit, the manual control is operated to close the circuit. This manual control also makes the battery energy available for use of the car radio, heater and other electrical accessories and equipment when the engine is not running. The switch 39 is, in effect, a master switch adapted to be manually operated, and the automatically controlled switch is also a master switch adapted to be operated in response to turning over of the engine. Therefore all the circuits of the automobile are automatically controlled by a master switch, and yet should it be desirable to utilize any or all of the circuits even though the automatic master switch is not connecting the battery for such utilization, this may be accomplished by operating the manual master switch shunted to the automatic switch. The invention thus provides a master control for all the circuits in an automobile wherein advantage is had of automatic control without any of the disadvantages which have heretofore characterized such control.

Variations and modifications may be made within the scope of this invention and portions of the improvements may be used without others.

I claim:

1. A circuit controller for use in an automotive conveyance having an engine and a pipe line extending from the intake manifold of the engine, comprising a metal casing connected to said pipe line; a pressure-operated member in said casing dividing same into two airtight chambers; a contact on the casing and insulated therefrom; an electrical terminal on the casing and connected thereto; a second contact adapted to engage the first contact, carried by the pressure-operated member so as to be electrically connected through the casing with the terminal thereof at all times, said second contact operating in response to movement of the pressure-operated member whereby it engages the first contact when the engine is running, and disengages the first contact when the engine is at a standstill; a third contact carried by and connected to the casing; a fourth contact on the casing but insulated therefrom, adapted to engage said third contact, the fourth contact being electrically connected with the first-mentioned contact; means for manually operating said fourth contact.

2. An automatic control for automobile circuits, comprising a metal casing; means for connecting said casing to the intake manifold of the automobile engine so that a decreased pressure is effected in the casing; a pressure-operated member in said casing dividing same into two chambers; an electrical terminal on the casing and electrically connected thereto; a contact in the casing, insulated therefrom; a second contact adapted to engage the first contact, carried by the pressure-operated member to be electrically connected with the casing and terminal thereof at all times, said second contact operating in response to movement of the pressure-operated member whereby the contact engages the first contact when the engine is running, and disengages the first contact when the engine is at a standstill; a third contact carried by the casing and electrically connected thereto; a fourth contact on the casing but insulated therefrom, adapted to engage said third contact, the fourth contact being electrically connected with the first-mentioned contact; and means for manually operating said fourth contact to engage or disengage the third contact.

3. A pressure-operated circuit control comprising a semicylindrical metal casing; pipe means for connecting said casing with a pressure-varying device; a vane pivotally mounted in the casing and engaging the walls of the casing, thereby dividing same into two airtight chambers, and moving in response to differences in air pressure on its opposite faces; an electrical terminal on the casing and connected thereto; a contact on the casing, insulated therefrom, said contact being adapted to serve also as another electrical terminal; and a second contact adapted to engage the first contact and carried by the vane to move therewith so that variations of pressure in the casing will cause the contacts to engage and disengage each other.

4. The invention as defined in claim 3, in which the casing is provided with a vent to admit atmospheric pressure to the vane, said vent being adjustable so that the chamber into which it opens and the vane can be made to function as a dashpot to prevent fluttering of the vane for slight variations in pressure.

5. A circuit controller for use with an intake manifold of an internal combustion engine having a pipe line extending from the intake manifold of the engine, comprising a semicylindrical casing connected with the line; a vane pivotally mounted in the casing dividing the same into two airtight chambers, one of which communicates with the pipe line, said vane turning in response to differences of air pressure on its opposite faces; a switch having a stationary contact and movable contact; and means for connecting the movable contact to the vane to be moved thereby.

6. A circuit controller for use with an intake manifold of an internal combustion engine having a pipe line extending from the intake manifold of the engine, comprising a semicylindrical casing connected with the line; a vane pivotally mounted in the casing and contacting the walls thereof, thereby dividing the same into two airtight chambers, one of which communicates with the pipe line and the other being provided with a small vent to permit atmospheric pressure to one face of the vane, the vent and chamber functioning to confine air in such a manner that a dashpot effect is secured with the vane to prevent fluttering of the same on variations in the vacuum in the intake manifold, said vane turning in response to differences of air pressure on its opposite faces; a switch including a stationary contact and a movable contact; and means for connecting the movable contact to the vane to be moved thereby.

7. A circuit breaker adapted to be inserted in an electrical circuit including a casing; a vane pivoted on the casing in airtight relation therewith and movable in accordance with the air pressure in said casing; resilient means normally biasing the vane to one position; a switch including a stationary and movable contact; and means for connecting the movable contact with the vane to be moved thereby.

8. A circuit breaker adapted to be inserted in an electrical circuit, including a semicylindrical casing; a vane pivoted in airtight relation with the casing and movable in accordance with the air pressure in said casing; suction means acting on one face of the vane; resilient means tending to move the vane in opposition to said suction means; a switch comprising a stationary and movable contact; and means for connecting the movable contact with the vane to be moved thereby in accordance with the suction on the face of the vane.

9. A circuit breaker adapted to be inserted in an electrical circuit, including a casing; a vane pivoted in the casing and dividing the same into two airtight chambers; suction means connected to one side of the casing and acting on one face of the vane, the other face of the vane being subjected to atmospheric pressure by a vent in the casing; and means for adjusting the vent for different conditions of the suction means.

10. A circuit controller for use with an intake manifold of an internal combustion engine having a pipe line extending from the intake manifold of the engine, comprising a semicylindrical casing connected with the line; a vane pivotally mounted in the casing dividing the same into two airtight chambers, one chamber communicates with the pipe line and other being provided with a vent to admit atmospheric pressure to the other face of the vane; means for adjusting the vent to accommodate different conditions of intake vacuum; a switch comprising a stationary contact and a movable contact; and means for connecting the vane to the movable contact so that a small turning movement of the vane causes a comparatively large movement of the contact to effect quick opening and closing of the circuit.

11. A circuit controller for use with the intake manifold of an internal combustion engine having a pipe line extending from the intake manifold of the engine, comprising a semicylindrical casing connected with the line; a vane pivotally mounted in the casing in airtight relation with the walls thereof and dividing the same into two chambers; a switch comprising a stationary and movable contact, the movable contact being connected to the vane for movement thereby; a stop carried by the casing for limiting the movement of the vane in open-circuit position with the movable contact closely adjacent to the stationary contact so that the initial creation of the vacuum in the engine intake causes quick closing of the switch.

12. A circuit breaker adapted to be inserted in an electrical circuit including a semicylindrical casing; a vane pivoted in airtight relation with the casing and movable in accordance with the air pressure in said casing; a switch comprising a stationary and movable contact; means for connecting the movable contact with the vane to be moved thereby; and a spring carried within the casing and connected between the casing and vane to yieldingly urge the vane in a direction to maintain the switch contacts open, said spring being connected to the vane at a point between its axis and its outermost edge.

13. A circuit breaker adapted to be inserted in an electrical circuit, including a casing; a vane pivoted in airtight relation with the casing and movable in accordance with the air pressure in said casing; a switch including a stationary and movable contact; means for connecting the movable contact with the vane to be moved thereby; and auxiliary means manually operable to close the circuit independently of the operation of the vane.

14. A circuit breaker comprising a switch; resilient means normally urging said switch into open position; means associated with a prime mover adapted to hold the switch closed against the action of the resilient means so long as the prime mover is in operation, said last-named means comprising a semicylindrical casing; a vane pivoted in the casing and in sealed relation with the walls thereof and movable in response to pressure created by the prime mover; and means for connecting the vane to one of the switch elements whereby when the prime mover ceases to operate, the switch will quickly move to open-circuit position.

CHARLES H. ANGUS.